Nov. 29, 1966 W. A. E. LOUGHHEAD 3,289,180

MAGNETIC CORE MATRICES

Filed Nov. 5, 1962

4 Sheets-Sheet 1

INVENTOR
WILLIAM A.E. LOUGHHEAD
BY Paul M. Craig, Jr.
ATTORNEY

INVENTOR
WILLIAM A. E. LOUGHHEAD
BY Paul M. Craig, Jr.
ATTORNEY

INVENTOR
WILLIAM A.E. LOUGHHEAD
BY Paul M. Craig, Jr.
ATTORNEY

INVENTOR
WILLIAM A.E. LOUGHHEAD
BY Paul M. Craig, Jr.
ATTORNEY

United States Patent Office 3,289,180

Patented Nov. 29, 1966

3,289,180

MAGNETIC CORE MATRICES

William Albert Edward Loughhead, Beeston, Nottingham, England, assignor to Ericsson Telephones Limited, Beeston, Nottingham, England, a British company Filed Nov. 5, 1962, Ser. No. 235,458
Claims priority, application Great Britain, Nov. 6, 1961, 39,713/61
10 Claims. (Cl. 340—174)

Figure 1:
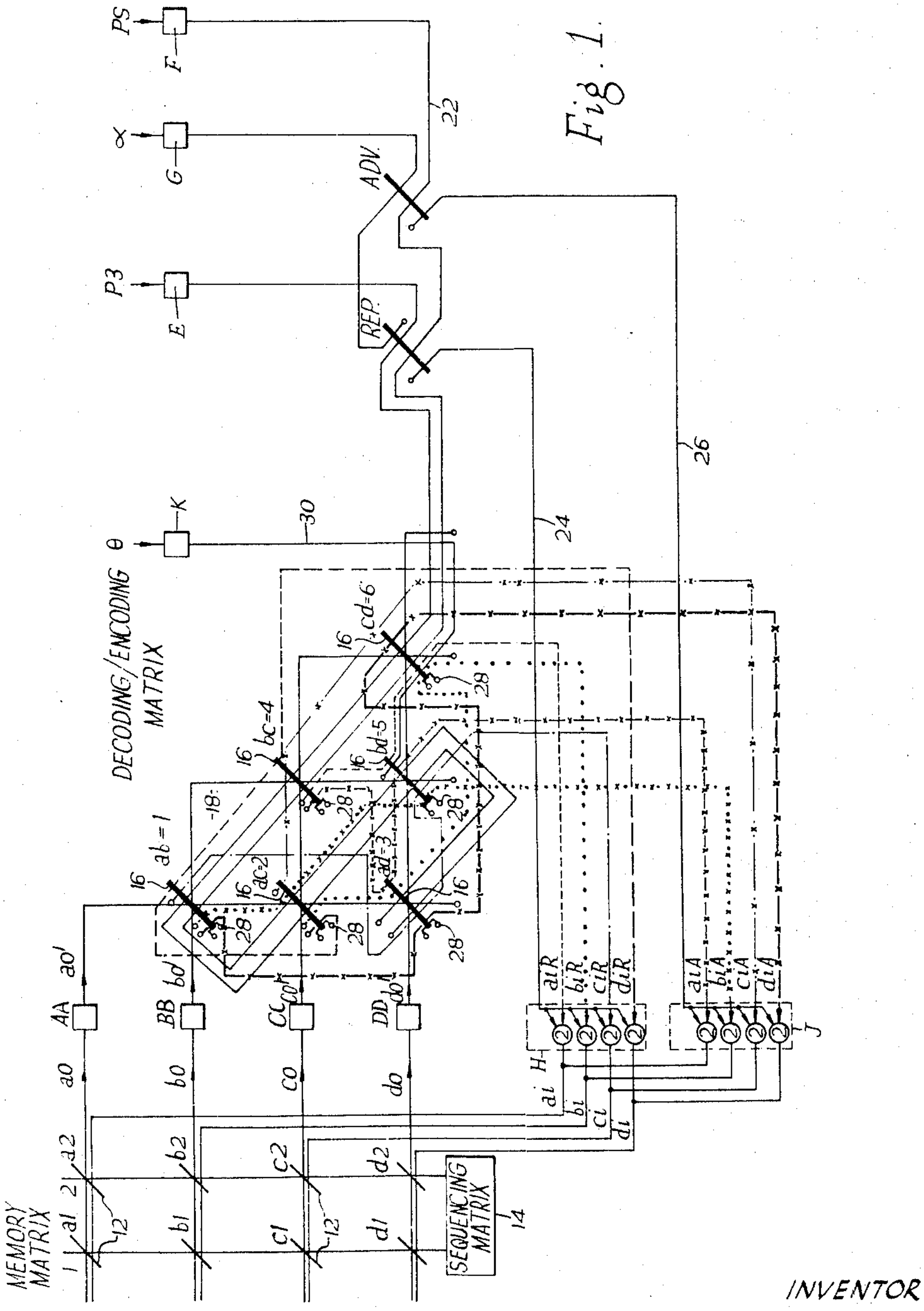

The present invention relates to magnetic core memory matrices.

The invention described and claimed in the specification of copending application Serial No. 895,268 filed December 14, 1959, now Patent No. 3,136,980 by George Arthur Matthews and assigned to the same assignee as the present application consists of apparatus comprising a main matrix of the type having a plurality of groups of cores, each adapted to assume alternatively one of two states of magnetisation, each group being referred to as a column of cores and storing a separate item of information in a predetermined code, the matrix being provided with a control circuit adapted to operate sequentially and repeatedly to cause or allow information to be read out of and written in to each column of cores in turn. In addition to the main matrix there are first and second temporary storage magnetic core stores and an arrangement of circuits, including windings associated with the cores of the matrix and the stores coupling the matrix to both stores in such a manner that an item of information can be read out of a column of cores of the main matrix and stored temporarily in each of the stores and be written back into the column of cores from either store. The arrangement of the said circuits is further characterised in that, when the information is written back from the first store it is written back in unmodified form and when the information is written back from the second store it is written back modified in a predetermined manner. The system further comprises a gating device responsive to a signal indicative of whether a first or a second condition obtains to cause information to be written back into the main matrix from the first or the second store according as to whether the first or the second condition respectively obtains.

The two states of a switchable magnetic core may be called the A and B states for convenience, the normal state being taken as the A state.

Such apparatus can have utility in electronic telephone exchange equipment for example, especially a time division multiplex (TDM) exchange. It is characteristic of automatic telephone exchange operation that a series of events have to be monitored and supervised in the setting up, metering and termination of a call. Many of the events take place at random instants of time as they are determined for example by the subscriber lifting his handset and so on. A TDM exchange operates on a cyclic basis however and there is obviously a problem involved in dealing with signals indicating random events.

The apparatus referred to will function in this situation as follows. In each cycle of operation each column of the matrix in turn is read out to the temporary stores and immediately read back in again. If a pulse signalling an event in a sequence is present in respect of any column in any cycle the reading back takes place with the modification; otherwise there is no modification.

In the simplest case each column of the main matrix is used as a counter and the modification consists in increasing the count by one. In this case the counter progresses through its successive states as the necessary signals are received requiring modification to take place.

It is an object of the present invention to provide apparatus capable of performing the same function as the above-described apparatus in a similar but improved manner. In particular it is desired to reduce the amount of temporary storage necessary and to make possible a shortened operating sub-cycle for each column of the main matrix.

The apparatus of this invention comprises a main matrix with a plurality of groups of magnetic cores, called columns of cores for convenience. Each column stores one item of information in known manner in accordance with which of its cores are set to an A remanent state and which to a B remanent state. In conjunction with the main matrix there is now provided *only one* temporary store and the items of information in the main matrix columns are read one by one into the temporary store and then immediately rewritten. The rewrite windings are coupled however by two different sets of circuits which are normally closed but which can be selectively opened. The connections of the two sets of circuits are different and such that if rewriting takes place by way of one set the item of information is unmodified, i.e. the previously existing pattern of A and B remanent states among the cores of the column of the main matrix is re-established. If, on the other hand, rewriting takes place by way of the other set of circuits, the item is modified in whatever manner is desired, that is to say the newly established pattern differs in some required way from the previously existing pattern.

Under some circumstances it may be appropriate to substitute for no modification and modification, a first modification and a second modification respectively.

What was achieved in our previous invention using two temporary storage matrices is now achieved using one only.

Also as will hereinafter be shown, a shorter cycle of operation can be used with the new invention.

Figures 2, 3:
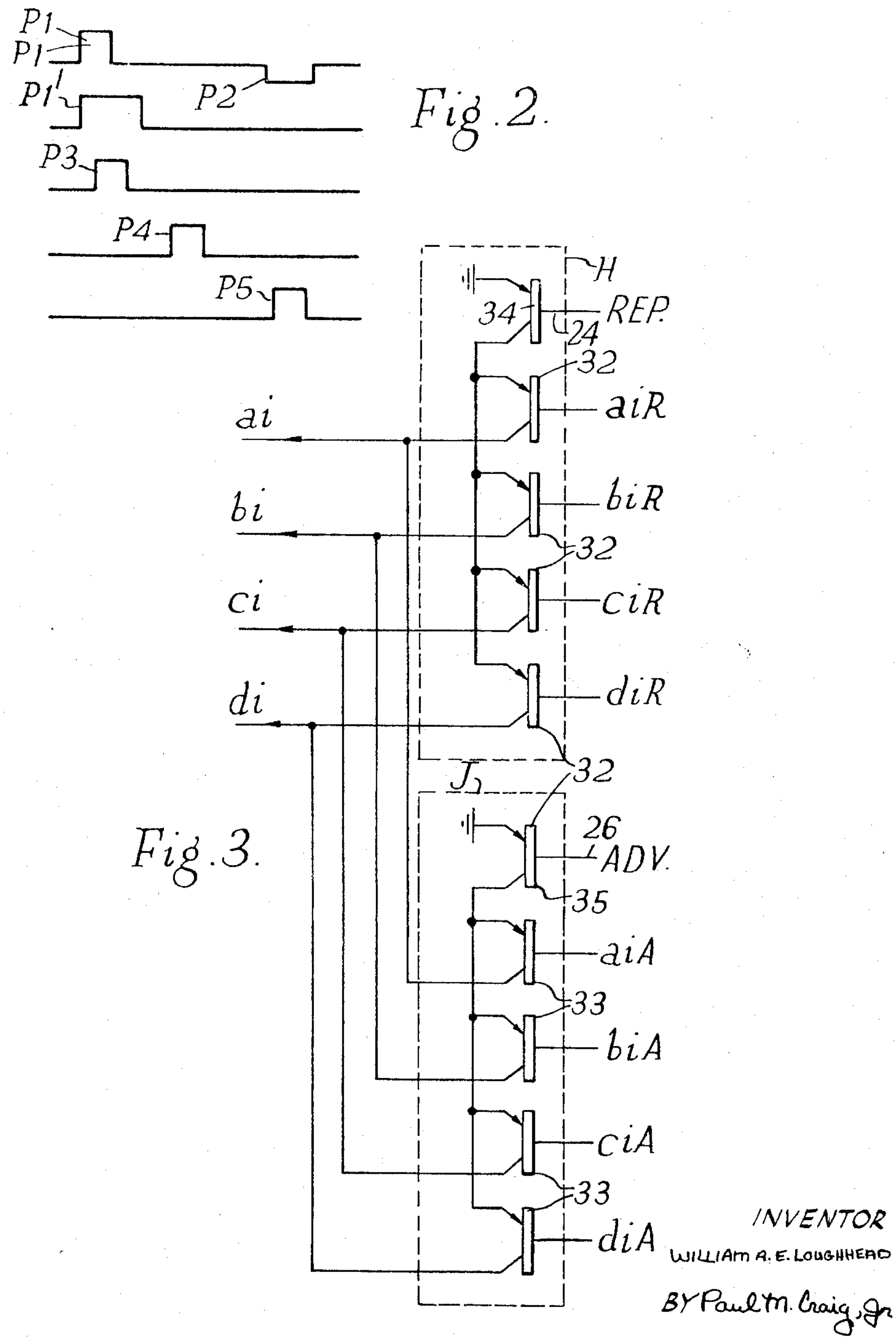
Figure 4:
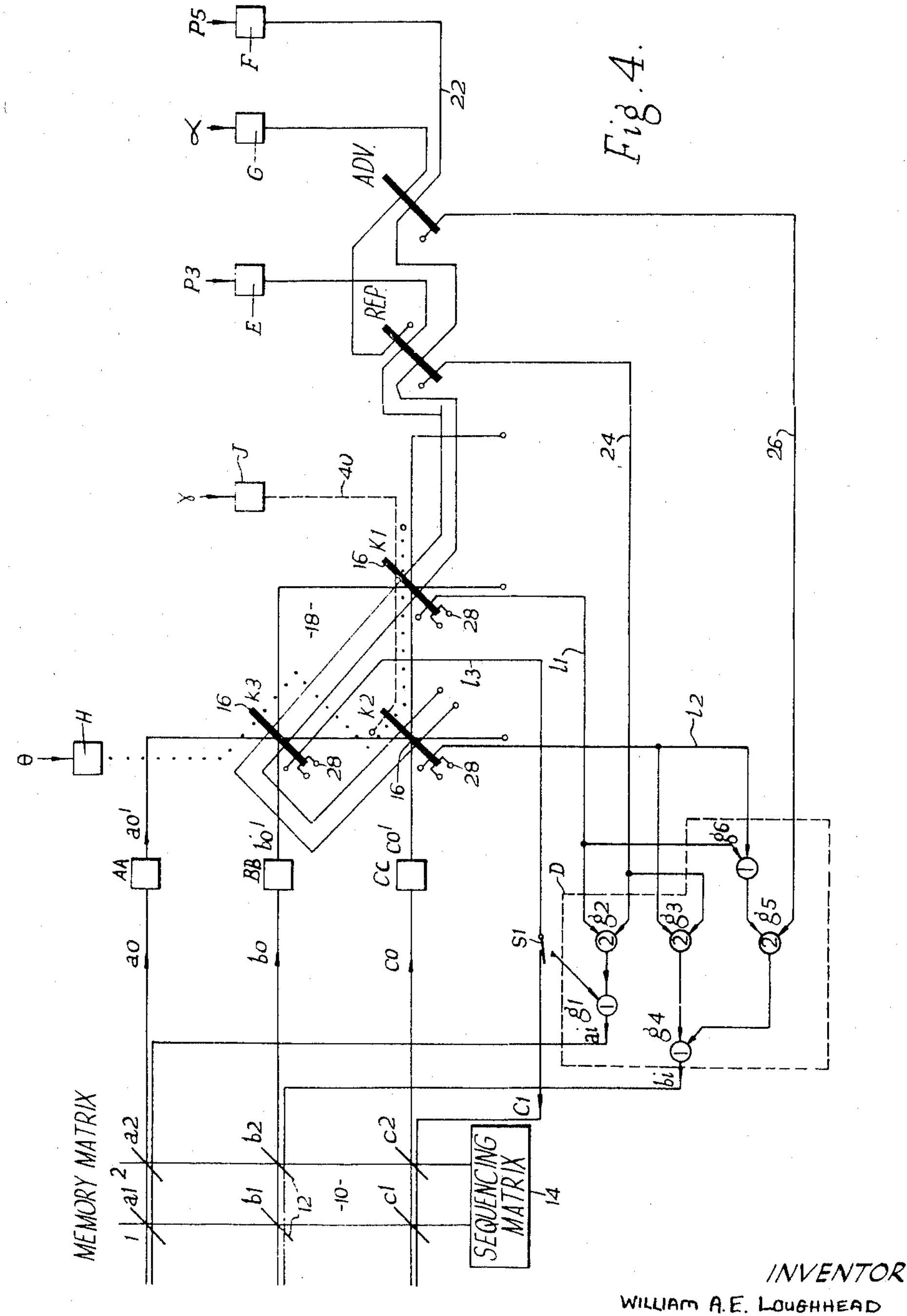
Figure 5:
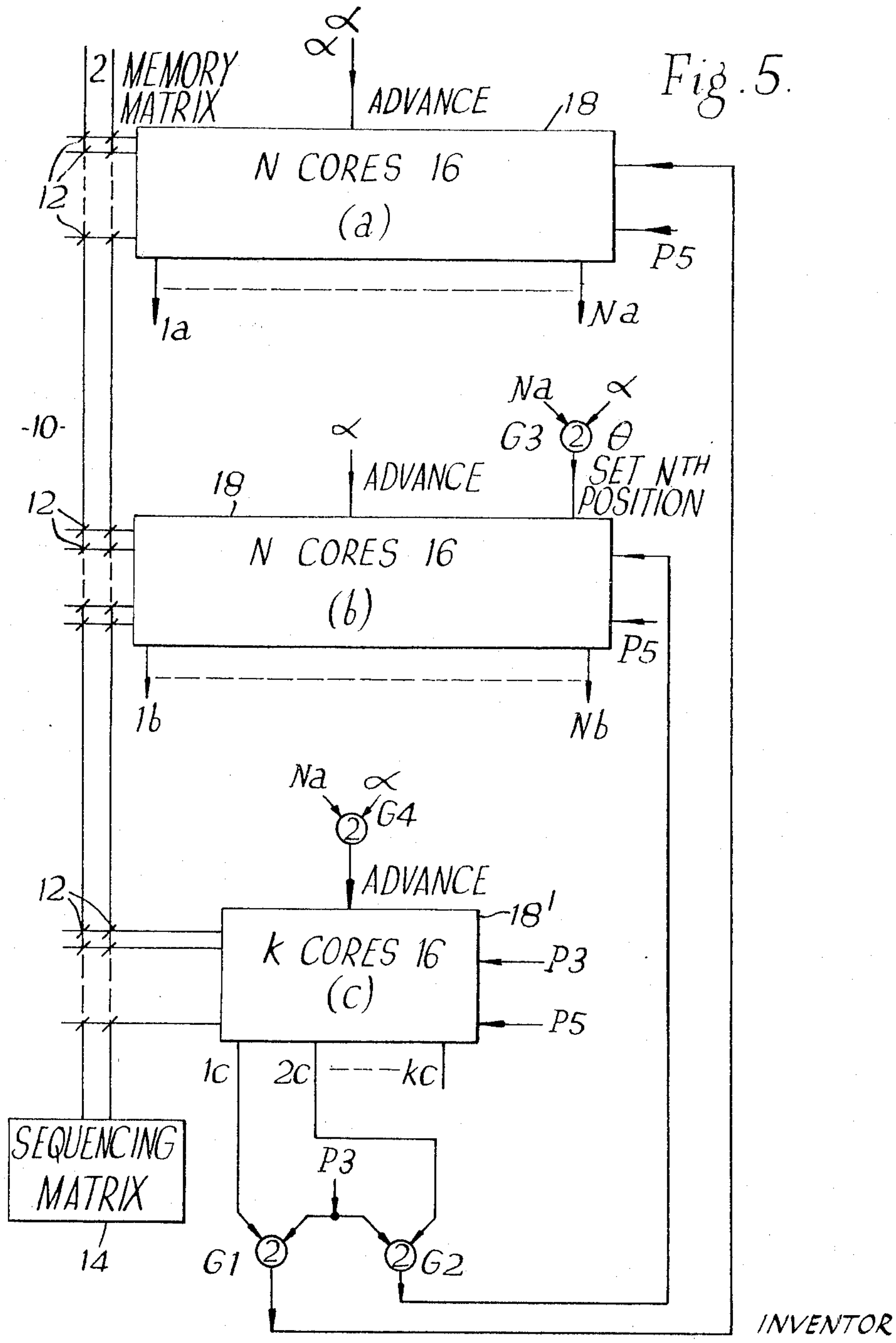

The invention will now be described in greater detail by way of example with reference to the accompanying drawings, in which:

FIG. 1 is a circuit diagram of a first embodiment of the invention, corresponding in function to the embodiment of FIG. 2 of the aforesaid prior specification, FIG. 2 is an explanatory diagram showing pulse timings, FIG. 3 shows part of FIG. 1 in more detail, FIG. 4 is a circuit diagram of a second embodiment of the invention, and FIG. 5 is a block schematic diagram of an extended counter embodying the invention.

The drawings are not intended to show senses of windings or numbers of turns. Neither is any significance to be attached to the polarities shown in FIG. 2.

The circuit shown in FIG. 1 comprises a main memory matrix 10 with a plurality of columns, each of four cores 12. Two columns, numbered 1 and 2, only are shown with cores $a_1$ to $d_1$ and cores $a_2$ to $d_2$. A sequencing matrix 14 applies full read pulses P1 and half-write pulses P2 (FIG. 2) to the columns in turn. The sequencing matrix may be as described in the specification of British Patent No. 875,875 for example.

Row output conductors $a_0$ to $d_0$ are connected to amplifiers AA to DD which amplify and lengthen output pulses to the form P1[1] shown in FIG. 2.

Items of information are stored in the columns of matrix 10 in accordance with the 2 out of 4 code (this being a particular example of the *m* out of *n* code) the numerical significance of each combination being as indicated in the first two columns of Table 1 below.

TABLE 1

| Memory Matrix 10 | Numerical Value | Selected Core in Decoding/ Encoding Matrix | Outputs to Memory Matrix on "Repeat" | Outputs to Memory Matrix on "Advance" |
|---|---|---|---|---|
| $c_1$ $d_1$ | 1 | *ab* | $c_1$ $d_1$ | $b_1$ $d_1$ |
| $b_1$ $d_1$ | 2 | *ac* | $b_1$ $d_1$ | $b_1$ $c_1$ |
| $b_1$ $c_1$ | 3 | *ad* | $b_1$ $c_1$ | $a_1$ $d_1$ |
| $a_1$ $d_1$ | 4 | *bc* | $a_1$ $d_1$ | $a_1$ $c_1$ |
| $a_1$ $c_1$ | 5 | *bd* | $a_1$ $c_1$ | $a_1$ $b_1$ |
| $a_1$ $b_1$ | 6 | *cd* | $a_1$ $b_1$ | $c_1$ $d_1$ |

The four output leads $a_0^1$ to $d_0^1$ from amplifiers AA to DD thread the six cores 16 of a decoding/encoding matrix 18 whose cores are indicated by the combinations *ab*, *ac* and so on. The pulses $P1^1$ in these leads bias the cores 16 towards saturation in their A state, preventing them from being switched to the B state. It will be seen that, for each combination of two cores $c_1d_1$ and so on, only one core 16 is unbiased in accordance with column 3 of Table 1.

A pulse P3 (FIG. 2) is applied by way of an amplifier E and conductor 20 in all cores 16 in the matrix 18 and also to a repeat core "REP" switching the unbiased core 16 and the core REP to the B state.

For writing back information into the main matrix 10 there are provided row conductors $a_1$ to $d_1$, two of these being pulsed synchronously with the pulse P2 applied to the appropriate column from the sequencing matrix 14. The pulses in the row conductors are derived by switching back to the A state that core in the matrix 18 which has been switched to the B state by the pulse P3.

Thus each core 16 is linked by two output circuits in a first set of four output circuits $a_1$R to $d_1$R. Each core is furthermore linked by two output circuits in a second set of four $a_1$A to $d_1$A. The circuits $a_1$R to $d_1$R are coupled to the conductors $a_1$ to $d_1$ respectively by gates H. Similarly the circuits $a_1$A to $d_1$A are coupled to the conductors $a_1$ to $d_1$ respectively by gates J.

Assuming that it is desired to write back into the matrix 10 without modification, no action is taken between read out and write back which takes place when half-write pulse P2 is applied to one column of matrix 10 simultaneously with the application of a pulse P5 (FIG. 2) through an amplifier F to a conductor 22 which links all cores 16, the core REP and a core ADV. Any of these cores in the B state are reset to the A state.

Pulses appear then in two of the leads $a_1$R to $d_1$R, in two of the leads $a_1$A to $d_1$A and, since core REP is reset, in a lead 24 forming the second input to the gates H. Two of the conductors $a_1$ to $d_1$ are therefore energised through the gates H and the corresponding cores in the relevant column of the main matrix are set to their B states. As can be checked these cores will be in every instance the same two cores as were in their B states prior to the application of pulse P1. This is also apparent from columns 1 and 4 of Table 1.

This may be regarded as the function "Repeat." The alternative function is "Advance" or add 1 to the number in the selected column of matrix 10. When this is required an input $\alpha$ is pulsed at time P4 (FIG. 2) and the pulse, amplified by amplifier G, resets core REP to the A state and sets core ADV to the B state. The ensuing pulse P5 resets core ADV at the same time as that core 16 which is in the B state and, as conductor 26 from core ADV forms the second input to gates J, it is now two of these gates that open and determine which cores of the matrix 10 are set to the B state.

Checking of the circuit diagram and Table 1 will show that in each instance the cores set to the B state represent the number 1 higher than that represented by the two cores that were originally in the B state.

To take one specific example, assume cores $c_1$ and $d_1$ in column 1 of matrix 10 are in the B state, representing 1. Pulse P1 resets these producing pulses $P1^1$ in conductors $c_0^1$ and $d_0^1$ so that core *ab* in matrix 18 is the only unbiased core. Pulse $P^3$ therefore sets core *ab* to the B state as well as setting core REP to the B state.

When the pulse P5 resets core *ab* pulses appear in conductors $c_1$R and $d_1$R and in conductors $b_1$A and $d_1$ A. In the case of "repeat" action pulses therefore pass to conductors $c_1$ and $d_1$ causing cores $c_1$ and $d_1$ to be set again to the B state. Again the number 1 is represented.

Should pulse $\alpha$ have applied however, pulses pass from conductors $b_1$A and $d_1$A to conductors $b_1$ and $d_1$, causing cores $b_1$ and $d_1$ to be set to the B state. The number now represented is 2.

In each cycle of operation the columns of the matrix 10 are treated in this way in sequence and the action of the circuit as so far described can be summarised by say that, for each column of the matrix 10, the number held is either left unaltered or increased by one by the action of the decoding/encoding matrix, depending upon whether a pulse $\alpha$ is absent or present in the time slot belonging to the column in question. Only two columns have been shown for simplicity but in practice larger numbers will be used, for example several hundred.

The minimum duration of the operating cycle of the apparatus is determined by the need to accommodate the pulse sequence illustrated in FIG. 2. A longer sequence was necessary with the invention described in the first-mentioned prior specification because, when pulses P2 and P5 have been applied, one temporary storage matrix remains uncleared and a further pulse is necessary to clear this matrix before the next column can be read out from the main matrix. The new apparatus can therefore operate more quickly and the control circuitry is simplified by the absence of the need to provide the additional clearing pulse.

The circuit of FIG. 1 shows the most convenient way of obtaining outputs from the memory matrix. This is not done directly. Rather the cores 16 are provided with output windings 28. Therefore the number held in any column of the matrix 10 is represented at time P3 in the time slot corresponding to that column by the winding 28 at which a pulse appears as one core 16 switches to the B state.

Clearly a third set of output circuits of matrix 18 and corresponding gates could be provided to give the possibility of subtracting 1 from the number stored as an alternative to "repeat" and "advance" (add 1). That apparatus according to the invention is not restricted to the performance of such simple arithmetical functions will appear from the subsequent description of FIG. 4. The description of FIGS. 1 and 3 will be completed first however.

FIG. 1 illustrates an alternative way of modifying an item of information. This is by resetting the core 16 which has been set by pulse P3, setting another to the B state. This is done by applying a pulse $\theta$ at time P4 through amplifier K to a conductor 30 linking, in the example shown, cores *bd* and *cd*. Assuming core *bd* to be set, pluse $\theta$ resets *bd* and sets *cd* to the B state. Such a facility can be provided to deal with certain special requirements.

If in any cycle of operation it is required to clear a column of the matrix, the pulse P3 is simply omitted. No core 16 is set to the B state and there are subsequently no pulses in any of conductors $a_1$ to $d_1$ to set cores in the column of the matrix. In some subsequent cycle a new item can be written in by switching the appropriate core 16 to the B state at time P4 by means of a circuit such as conductor 30.

FIG. 3 shows one form which gates H and J can take. Conductors $a_1$R to $d_1$R and $a_1$A to $d_1$A are applied to the bases of transistors 32 and 33. Conductors $a_1$ to $d_1$ are connected to the collectors of these transistors. Transistors 32 in the gates H are opened up by a transistor 34 when the base of the latter is pulsed from conductors 24. Transistor 33 in gates J are opened up by a transistor 35 when its base is pulsed from conductor 26.

The second embodiment of the invention shown in FIG. 4 is similar to that of FIG. 1 in all essential respects and will not be described in detail. Equivalent parts have the same reference. In this embodiment, a 1 out of $k$ code is used with $k$ taken as 3 to give a simple illustration.

Corresponding to cores $a_1$, $b_1$ and $c_1$ in the memory matrix 10 are cores $k_1$, $k_2$ and $k_3$ in the matrix 18. When core $a_1$ for example is reset from the B state by pulse P1 (FIG. 2) the pulse P1$^1$ in conductor $a_0^1$ biases off cores $k_2$ and $k_3$ and only core $k_1$ is set to the B state by pulse P3.

The two sets of output conductors $a_1$A etc. and $a_1$R etc. of FIG. 1 are replaced by one output conductor $l_1$ to $l_3$ only per core 16. These conductors divide however giving two sets of circuits through a gating system D controlled by the pulses in conductors 24 (repeat) and 26 (advance). The gating system D consists of gates *g1* to *g6* which may be transistor gates akin to those of FIG. 3.

The different operations of the apparatus will now be considered:

*Core $a_1$ set*

Pulse P3 sets $k_1$ and P5 results in pulse in $l_1$.
Repeat: Pulses in $l_1$ and 24 open *g2* and *g1* and pass to $a_1$, again setting $a_1$.
Advance: Pulses in $l_1$ and 26 open *g6*, *g5* and *g4* and pass to $b_1$, setting $b_1$.

*Core $b_1$ set*

Pulse P3 sets $k_2$ and P5 results in pulse in $l_2$.
Repeat: Pulses in $l_2$ and 24 open *g3* and *g4* and pass to $b_1$, again setting $b_1$.
Advance: Pulses in $l_2$ and 26 open *g6*, *g5* and *g4* and pass to $b_1$, again setting $b_1$. In the case of core $b_1$ therefore Advance has the same effect as Repeat and until other special measures are taken, the matrix remains on $b_1$.

*Core $c_1$ set*

Pulse P3 sets $k_3$ and P5 results in pulse in $l_3$. This pulse is not gated in dependence upon signals from cores REP and ADV but passes either to $a_1$ (setting $a_1$) or to $c_1$ (again setting $c_1$) in dependence upon the setting of a switch S1.

This embodiment of the invention illustrates that, for certain items of information (but not all) there may be no distinction between what happens under "Repeat" conditions and "Advance" conditions.

When it is required to move from core $b_1$ a circuit exists for switching core $k_2$ back to the A state and switching core $k_1$ to the B state. This circuit comprises pulse input $\gamma$, amplifier J and conductor 40 linking cores $k_1$ and $k_2$. A pulse is of course applied at $\gamma$ at time P4 (FIG. 2).

Another circuit comprising pulse input $\theta$, amplifier H and conductor 42 linking all cores $k_1$ to $k_3$ exists for switching either $k_1$ or $k_2$ from the B state to the A state and switching $k_3$ to the B state so that the ensuing pulse P5 either sets $a_1$ or $c_1$ to the B state depending upon the setting of switch S1.

The following will make clear why the functions described for the circuit of FIG. 4 may be required. The cores $k_1$ to $k_3$ provide outputs in their windings 28 at the time of pulse P3 and these outputs are fed to different parts of the complete apparatus to indicate certain functions. The outputs from cores $k_1$ and $k_2$ can represent "X" and "NOT X" respectively. It is normally required that, for a given column of the main matrix, the output "NOT X" shall be supplied so long as no pulse $\alpha$ appears but that, once a pulse $\alpha$ appears the output "X" will be supplied and continue to be supplied until the end of a certain sequence of operations, irrespective of whether further pulses $\alpha$ appear or not. It is clear that the described functions conform to this. Pulse $\gamma$ provides the facility of terminating this state and returning to "NOT X" outputs pending the arrival of the next pulse $\alpha$.

The core $k_3$ is included because the prevailing logical conditions sometimes require a third condition other than "X" and "NOT X." Alternatively the core $k_3$ can provide the same logical function as core $k_2$ but is, with switch S1 in the position shown, unaffected by signal $\gamma$. Setting S1 to the other position enables the circuit to revert to $k_1$.

To be more specific the circuit described can be used as the Pulse Out Relay in a telephone director system. Core $k_1$ provides the signal "CLOSE LOOP." At some time later signal $\alpha$ arrives and moves $k_1$ to $k_2$ which signals "OPEN LOOP." Subsequently $\gamma$ signals the return to "CLOSE LOOP." Under forced release conditions the loop must be maintained "OPEN" for 1 second irrespective of what signals $\alpha$ and $\gamma$ may arrive. Signal $\theta$ achieves this by setting $k_3$, switch S1 being set as shown so that read out continues from $k_3$ until the end of the 1 second interval when clear down of the equipment occurs. In this switch S1 is changed over to cause reversion to $k_1$ (CLOSE LOOP).

The apparatus of FIG. 1 allows counting to be effected from 1 to 6. In general an $m$ out of $n$ code allows counting from 1 to N where $N=n!/m!\ (n-m)!$. A number of circuits such as are shown in FIG. 1 can be coupled together with a circuit like that of FIG. 4 to give a $k \times N$ counter. Such an arrangement is illustrated in FIG. 5 where two matrices 18 only are shown for simplicity, in addition to the 1 out of $k$ matrix identified as 18'.

Each column of the main matrix has $n$ cores for each matrix 18 and $k$ cores for the matrix 18'. The matrices 18 and 18' are further identified by the letters $a$, $b$ and $c$. In correspondence therewith the outputs of the matrix ($a$) are identified as 1$a$ to N$a$, the outputs of matrix ($b$) as 1$b$ to N$b$ and the outputs of matrix ($c$) as 1$c$ to $kc$.

Considering one column of the matrix 10 only (since all columns are simply treated alike in sequence) the number initially held can be called "1" and is represented, when read out from the matrix 10 to the matrices 18 and 18' results in outputs at 1$a$ and 1$c$ only. Matrix $b$ is empty.

The pulses P3 to matrices ($a$) and ($b$) are gated through gates G1 and G2 by outputs 1$c$ and 2$c$ respectively of matrix ($c$). So long therefore as matrix ($c$) remains at 1$c$, entries are only made into matrix ($a$) and assuming that $\alpha$ pulses are applied, the count in ($a$) rises by 1 in each cycle of operation, that is outputs are produced at 1$a$, 2$a$, 3$a$ and so on in succession.

When a count of N is reached, an output appears at N$a$ and gates the ensuing $\alpha$ pulse through gates G3 and G4. The pulse passing through gate G3 to matrix ($b$) acts like the $\theta$ inputs described in connection with FIGS. 1 and 4 with the effect of setting the Nth position of matrix ($b$).

The pulse passing through gate G4 to matrix ($c$) is an advance pulse and shifts the output of this matrix from 1$c$ to 2$c$ so that ensuing pulses P3 pass not to matrix ($\alpha$) but to matrix ($b$). Counting therefore continues with the aid of this matrix, the next pulse resulting in a shift from N$b$ to 1$b$.

It will be seen that the matrices 18 are used in turn to count from 1 to N, the matrix ($b$) taking over when ($a$) fills and so on. The matrix 18' performs the control function of sequencing the matrices 18.

It will be appreciated that the inputs to the gates G1 to G4 will have to be brought into time coincidence. This is so well understood a matter that the means for doing it are not shown. Where the signals are not originally coincident, the earlier will typically be delayed to coincide with the later.

Assuming that the circuits described are to be used in a telephone exchange it will usually be necessary to make provision whereby the columns of the matrix can be seized by susbscribers as calls are initiated and freed when the calls are terminated. This is of course to enable a plurality of columns of the matrix to serve a larger number of subscribers. This particular feature is not essential to the understanding or practice of the present invention and can in any case be carried out on the basis of known techniques. A description is not therefore included.

However, it may be arranged that, when a particular column of the matrix is seized, the above-described operations take place with pulse P3 setting the core REP during the digit interval belonging to that column. On the other hand, when the column is free it may be arranged not to operate in this way but always to set particular ones of the cores of the column to the B state, thus establishing a datum state for that column, ready for operation when next the column is seized. Whilst this may be done by use of a $\theta$ input for example as described in conjunction with FIGS. 1 and 4, the following alternative may be preferred in some instances.

In the alternative, when a column is free, no pulse P3 is applied in its digit interval and no core of the decoding/encoding matrix is switched. At the time when P3 would otherwise occur, however, another pulse is applied to a further core and also to the core REP, setting both these to the B state. The subsequent pulse P5 resets the REP core, opening the H gates (taking the embodiment of FIG. 1 for example) in the manner already described. P5 simultaneously resets the said further core and provides outputs in two lines coupled, for example, into lines $c_1$R and $d_1$ R by way of "or" gates.

These outputs will pass through to conductors $c_1$ and $d_1$, so setting the $c$ and $d$ cores in the matrix column in question.

This is therefore yet another optional feature of the described apparatus, showing the versatile way in which the apparatus lends itself to meeting any particular requirements.

I claim:

1. In magnetic core memory apparatus the combination of:

a main matrix having a plurality of groups of magnetic cores switchable to A and B states, said columns storing respective, individual items of information in accordance with which cores thereof are in the A state and which in the B state;

a plurality of temporary storage cores;

means for reading into said temporary storage cores one item at a time of information from a selected group of said main matrix;

first and second selectively switchable circuits coupling said temporary storage cores back to said main matrix in two different ways; and means for reading out of said temporary storage cores and simultaneously enabling one of said first and second circuits so as to write back into said main matrix information related to the information originally read out in one of two different ways corresponding to said first and second circuits.

2. Magnetic core memory apparatus according to claim 1, wherein information written back by way of said first circuits is unmodified whilst information written back by way of said second circuits is modified in a predetermined manner.

3. Magnetic core memory apparatus according to claim 2, wherein said items of information are numbers and a number written back by way of said second circuits is increased by one.

4. In magnetic core memory apparatus the combination of:

a main matrix having a plurality of groups of magnetic cores switchable to A and B states, said columns storing respective, individual items of information in accordance with which cores thereof are in the A state and which in the B state;

a plurality of temporary storage cores;

means for reading into said temporary storage cores one item at a time of information from a selected group of said main matrix;

first and second sets of conductors coupling said temporary storage cores back to said main matrix in two different ways;

first and second sets of normally closed gates included in said first and second sets of conductors respectively; and means for reading out of said temporary storage cores and simultaneously opening a selected one of said first and second sets of gates.

5. In magnetic core memory apparatus the combination of:

a main matrix having a plurality of groups of magnetic cores switchable to A and B states, said columns storing respective, individual items of information in accordance with which cores thereof are in the A state and which in the B state;

a plurality of temporary storage cores;

means for reading into said temporary storage cores one item at a time of information from a selected group of said main matrix;

a complex of gating circuits having inputs and first and second sets of outputs;

circuits for applying first and second gating signals to said gating circuits to couple said inputs respectively to said first and second outputs;

conductors coupling said temporary storage cores to said gating circuit inputs;

further conductors coupling said first and second sets of outputs in two different ways to said main matrix; and means for reading out of said temporary storage cores and simultaneously applying a selected one of said first and second gating signals.

6. In magnetic core memory apparatus the combination of:

a main matrix having a plurality of groups of magnetic cores switchable to A and B states, said columns storing respective, individual items of information in accordance with which cores thereof are in the A state and which in the B state;

a plurality of temporary storage cores;

means for reading into said temporary storage cores one item at a time of information from a selected group of said main matrix;

first and second selectively switchable circuits coupling said temporary storage cores back to said main matrix in two different ways;

first and second further cores switchable from B state to A state to provide gating signals for enabling said first and second circuits respectively;

means for setting a selected one of said further cores to the B state; and means for thereafter reading out of said temporary storage cores and simultaneously resetting said selected further core to the A state.

7. In magnetic core memory apparatus the combination of:

a main matrix having a plurality of groups of magnetic cores switchable to A and B states, said columns storing respective, individual items of information in accordance with which cores thereof are in the A state and which in the B state;

a plurality of temporary storage cores;

means for reading into said temporary storage cores one item at a time of information from a selected group of said main matrix;

first and second selectively switchable circuits coupling said temporary storage cores back to said main matrix in two different ways;

means for initially setting said first further core always to the B state;

means for thereafter optionally setting said second further core to the B state and resetting said first further core to the A state; and means for thereafter reading out of said temporary storage cores and simultaneously resetting to its A state that one of said further cores which is in its B state.

8. Magnetic core memory apparatus according to claim 1, wherein each different item of information appears, as stored in said temporary storage cores, as a setting to the B state of a different one of said cores, said apparatus additionally comprising an optionally operable circuit for resetting one such core to the A state and setting another to the B state in between reading of information from the main matrix and writing back in again.

9. In magnetic core memory apparatus the combination of:

a main matrix having a plurality of groups of magnetic cores switchable to A and B states, said columns storing respective, individual items of information in accordance with which cores thereof are in the A state and which in the B state;

a plurality of first temporary storage matrices;

a further temporary storage matrix;

means for writing information into one of said first matrices and into said further matrix from one group of said main matrix;

means for selecting said first matrices in sequence in response to the items of information stored by said further matrix;

first and second selectively switchable circuits coupling said temporary storage matrices back to said main matrix in two different ways; and means for reading out of said selected first matrix and said further matrix and simultaneously enabling one of said first and second circuits.

10. In magnetic core memory apparatus the combination of:

a main matrix having a plurality of groups of magnetic cores switchable to A and B states, said columns storing respective, individual numbers in accordance with which cores thereof are in the A state and which in the B state;

a plurality of first temporary storage matrices;

a further temporary storage matrix;

means for cyclically writing a number into one of said first matrices and a number into said further matrix;

means for selecting said first matrices in sequence in response to the numbers stored by said further matrix;

first and second selectively switchable circuits coupling said temporary storage matrices back to said main matrix in two different ways;

means for supplying an advance signal in certain cycles only;

means for reading out of said selected matrix and writing back into said main matrix by way of said first circuits in any cycle not containing an advance signal, so as to leave the read out number unmodified;

means for reading out of said selected matrix and writing back into said main matrix by way of said circuits in any cycle containing an advance signal, so as to advance by one the read out number;

means for reading out of said further matrix and writing back into said main matrix normally by way of said first circuits; and means for reading out of said further matrix and writing back into said main matrix by way of said second circuits in any cycle when said selected matrix fills, so as to select thereafter the next one of said first matrices.

No references cited.

BERNARD KONICK, *Primary Examiner.*

G. LIEBERSTEIN, *Assistant Examiner.*